United States Patent
Chiba

(10) Patent No.: US 12,508,749 B2
(45) Date of Patent: Dec. 30, 2025

(54) MULTILAYER BODY FOR ROLLING, ROLLED BODY AND METHOD FOR PRODUCING ROLLED BODY

(71) Applicant: Sumitomo Chemical Company, Limited, Tokyo (JP)

(72) Inventor: Shunsuke Chiba, Ichihara (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 483 days.

(21) Appl. No.: 17/442,595

(22) PCT Filed: Mar. 9, 2020

(86) PCT No.: PCT/JP2020/009935
§ 371 (c)(1),
(2) Date: Sep. 23, 2021

(87) PCT Pub. No.: WO2020/203064
PCT Pub. Date: Oct. 8, 2020

(65) Prior Publication Data
US 2022/0184860 A1    Jun. 16, 2022

(30) Foreign Application Priority Data
Mar. 29, 2019    (JP) .................. 2019-066441

(51) Int. Cl.
*B32B 27/32*    (2006.01)
*B29C 43/00*    (2006.01)
(Continued)

(52) U.S. Cl.
CPC .......... *B29C 43/203* (2013.01); *B29C 43/003* (2013.01); *B32B 27/08* (2013.01);
(Continued)

(58) Field of Classification Search
CPC ............ B32B 2250/02; B32B 2250/03; B32B 2264/10; B32B 2274/00; B32B 2307/30;
(Continued)

(56) References Cited

U.S. PATENT DOCUMENTS

2013/0273386 A1    10/2013 Matsumoto et al.
2017/0144417 A1    5/2017 Matsui et al.

FOREIGN PATENT DOCUMENTS

CN    103210034 A    7/2013
EP        947541 A1 * 10/1999    ............. C08L 23/10
(Continued)

OTHER PUBLICATIONS

Office Action issued Oct. 27, 2022 in CN Application No. 202080024436.8 (machine English translation).

*Primary Examiner* — Callie E Shosho
*Assistant Examiner* — Krupa Shukla
(74) *Attorney, Agent, or Firm* — Panitch Schwarze Belisario & Nadel LLP

(57) ABSTRACT

A multilayer body for rolling includes a layer A and a layer B. The body is configured such that: if the sum of the total thicknesses of layers A and B is taken as 100%, the total thickness of layer A is from 0.5% to 10% (inclusive) and the total thickness of layer B is from 90% to 99.5% (inclusive), and layer A is arranged in at least one surface. Layer A contains a specific amount of a propylene polymer component, a specific amount of a specific resin component that has a polar group in the molecular chain, and a specific amount of a specific thermoplastic elastomer component that does not have a polar group in the molecular chain. Layer B contains a specific amount of a propylene polymer component and a specific amount of an inorganic filler.

3 Claims, 1 Drawing Sheet

(51) Int. Cl.
*B29C 43/20* (2006.01)
*B32B 27/08* (2006.01)
*B32B 27/20* (2006.01)
B29K 23/00 (2006.01)
B29K 309/00 (2006.01)

(52) U.S. Cl.
CPC .............. *B32B 27/20* (2013.01); *B32B 27/32* (2013.01); *B29K 2023/12* (2013.01); *B29K 2309/14* (2013.01); *B32B 2264/104* (2013.01); *B32B 2270/00* (2013.01); *B32B 2307/308* (2013.01); *B32B 2307/732* (2013.01)

(58) Field of Classification Search
CPC ......... B32B 25/14; B32B 27/20; B32B 27/32; B32B 27/302; B32B 27/308; B32B 2270/00

See application file for complete search history.

(56) References Cited

FOREIGN PATENT DOCUMENTS

| | | | |
|---|---|---|---|
| JP | S61144343 | A | 7/1986 |
| JP | S63011335 | A | 1/1988 |
| JP | H0404147 | A | 1/1992 |
| JP | H06305097 | A | 11/1994 |
| JP | H08302090 | A | 11/1996 |
| JP | 2008195070 | A | 8/2008 |
| JP | 4335073 | B2 | 9/2009 |
| JP | 201596586 | A | 5/2015 |
| JP | 6191762 | B2 | 9/2017 |

* cited by examiner

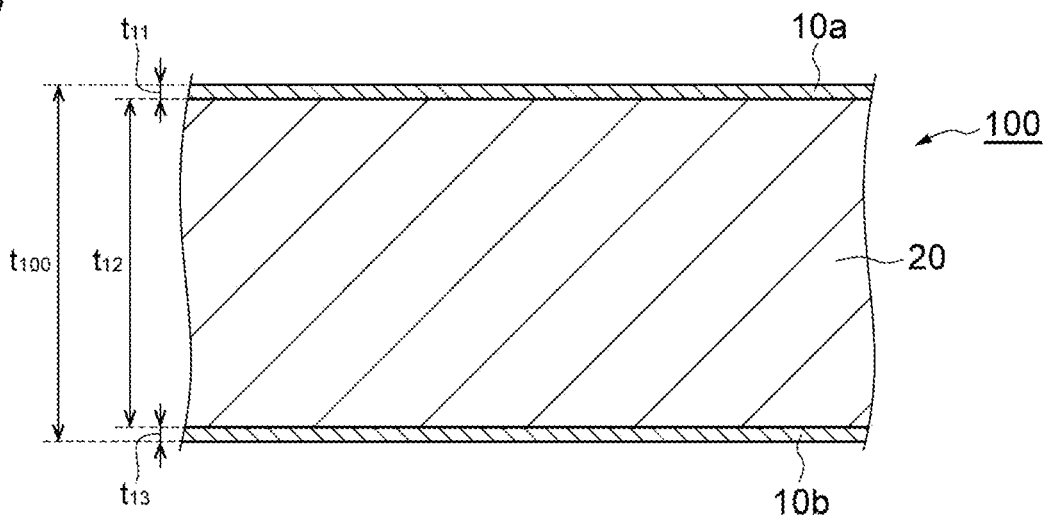
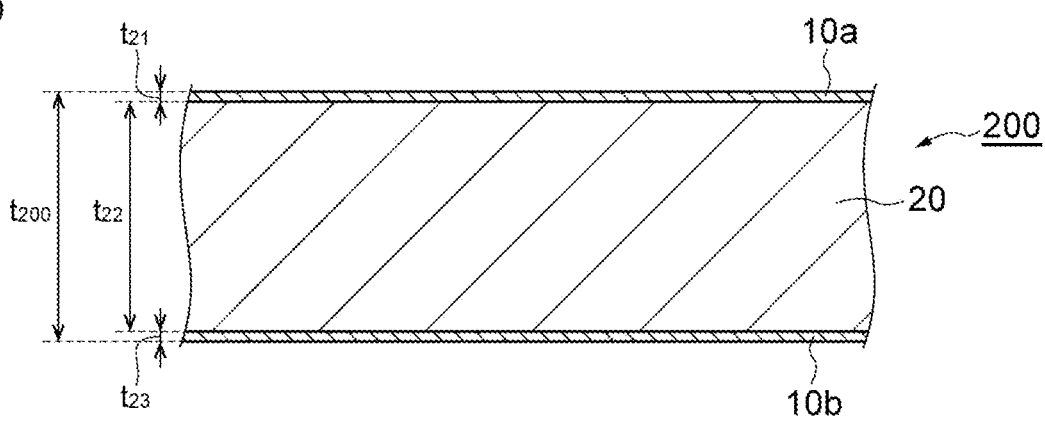

MULTILAYER BODY FOR ROLLING, ROLLED BODY AND METHOD FOR PRODUCING ROLLED BODY

CROSS-REFERENCE TO RELATED APPLICATIONS

This application is a Section 371 of International Application No. PCT/JP2020/009935, filed Mar. 9, 2020, which was published in the Japanese language on Oct. 8, 2020, under International Publication No. WO 2020/203064 A1, which claims priority under 35 U.S.C. § 119 (b) to Japanese Application No. 2019-066441, filed Mar. 29, 2019, the disclosure of each of which is incorporated herein by reference in its entirety.

TECHNICAL FIELD

The present invention relates to a multilayer article for compression molding, a compression molded article, and a method for producing a compression molded article.

BACKGROUND ART

Molded articles containing a propylene polymer are very inexpensive and light in weight, so that such molded articles are used in various industrial parts such as automobile interior and exterior parts, and home appliance parts.

As one of methods for producing such molded articles containing a propylene polymer, compression molding is known. Compression molding is a method capable of improving shock resistance of such molded articles. Recently, a molded article formed by compression molding a multilayer article containing a propylene polymer.

Patent Document 1 describes a multilayer article for compression molding, from which a molded article with excellent shock resistance can be obtained, and such a molded article.

PRIOR ART DOCUMENTS

Patent Document

Patent Document 1: JP-B2-6191762

SUMMARY OF THE INVENTION

Problems to be Solved by the Invention

However, the multilayer article for compression molding and a molded article formed from the multilayer article by compression molding described in Patent Document 1, which have an excellent shock resistance, are not specifically described therein as to coating properties after the compression molding, and it appears that the coating properties may be further improved. Thus, an object of the present invention is to provide a multilayer article for compression molding, which can express excellent coating properties after compression molding. Moreover, an object of the present invention is to provide a compression molded article with excellent coating properties and a method for producing such a compression molded article.

Means for Solving the Problems

A multilayer article for compression molding according to the present invention comprises at least one layer A described below and at least one layer B described below, a total thickness of the at least one layer A is 0.5% or more but 10% or less, and a total thickness of the at least one layer B is 90% or more but 99.5% or less, where a sum of the total thickness of the at least one layer A and the total thickness of the at least one layer B is 100%, and the at least one layer A is provided in such a way that a layer A is provided on at least one side of the multilayer article.

Layer A: the at least one layer A contains a propylene polymer component (A1), a resin component (A2) having polar group(s) in its molecular chain, and a thermoplastic elastomer component (A3) having no polar group(s) in its molecular chain, in such a way that content of the propylene polymer component (A1) is 20 wt % or more but 80 wt % or less, content of the resin component (A2) is 10 wt % or more but 50 wt % or less, and content of the thermoplastic elastomer component (A3) is 10 wt % or more but 30 wt % or less, where a sum of the contents of the propylene polymer component (A1), the resin component (A2), and the thermoplastic elastomer component (A3) is 100 wt %.

Resin component (A2) having polar group(s) in its molecular chain: the resin component having polar group(s) in its molecular chain is such that a melt mass flow rate measured at 190° C. under a load of 2.16 kgf is 0.01 g/10 min or more but 1.49 g/10 min or less.

Thermoplastic elastomer component (A3) having no polar group(s) in its molecular chain: the thermoplastic elastomer component having no polar group(s) in its molecular chain is such that a melt mass flow rate measured at 190° C. under a load of 2.16 kgf is 4 g/10 min or less.

Layer B: the at least one layer B contains a propylene polymer component (B1) and an inorganic filler (B2), in such a way that content of the propylene polymer component (B1) is 50 wt % or more but 80 wt % or less, and content of the inorganic filler (B2) is 20 wt % or more but 50 wt % or less, where a sum of the contents of the propylene polymer component (B1) and the inorganic filler (B2) is 100 wt %.

Such a multilayer article for compression molding can express excellent coating properties after compression molding.

The inorganic filler (B2) described above may satisfy requirement (1-a) described below, requirement (1-b) described below, and requirement (1-c) described below.

The requirement (1-a): median diameter D50 (L) measured by a laser diffraction method according to JIS R1629 is 10 μm or more but 25 μm or less.

The requirement (1-b): median diameter D50 (S) measured by centrifugal sedimentation method according to JIS R1619 is 2 μm or more but 3 μm or less.

The requirement (1-c): an aspect ratio constant calculated out by equation (1) is 2 or more but 15 or less.

$$\text{Aspect ratio constant} = \{D50(L) - D50(S)\}/D50(S) \qquad (1).$$

With this configuration, the coating properties after compression molding can be further improved.

The inorganic filler (B2) may be talc. With this configuration, the coating properties after compression molding can be further improved.

The resin component (A2) having polar group(s) in its molecular chain may be a resin with at least one kind of polar group selected from the group consisting of maleic anhydride group, hydroxy group, carboxy group, epoxy group, cyano group, isocyanate group, vinyl group, acrylate group, and methacrylate group. With this configuration, the coating properties after compression molding can be further improved.

The resin component (A2) having polar group(s) in its molecular chain may be a resin with at least one kind of polar group selected from the group consisting of maleic anhydride group, hydroxy group, epoxy group, cyano group, vinyl group, acrylate group, and methacrylate group. With this configuration, the coating properties after compression molding can be further improved.

The resin component (A2) having polar group(s) in its molecular chain may be a resin with at least one kind of polar group selected from the group consisting of acrylate group and methacrylate group. With this configuration, the coating properties after compression molding can be further improved.

The resin component (A2) having polar group(s) in its molecular chain may contain a structural unit derived from a compound having the polar group by 5 wt % or more but 50 wt % or less. With this configuration, the coating properties after compression molding can be further improved.

The thermoplastic elastomer component (A3) having no polar group(s) in its molecular chain may be an olefin-based elastomer or a styrene-based elastomer. With this configuration, the coating properties after compression molding can be further improved.

The thermoplastic elastomer component (A3) having no polar group(s) in its molecular chain may be an elastomer comprising a structural unit derived from propylene or a C4 to C10 α-olefin, and a structural unit derived from ethylene. With this configuration, the coating properties after compression molding can be further improved.

The thermoplastic elastomer component (A3) having no polar group(s) in its molecular chain may be an elastomer comprising a structural unit derived from propylene or a C4 to C6 α-olefin, and a structural unit derived from ethylene. With this configuration, the coating properties after compression molding can be further improved.

The compression molded article according the present invention is produced by compression molding the multilayer article for compression molding in such a way that a sum of a total thickness of the layer(s) A and a total thickness of the layer(s) B will be 10% or more but 69% or less. Such a compression molded article has excellent coating properties.

The compression molded article may be produced by compression molding the multilayer article for compression molding in such a way that a sum of a total thickness of the layer(s) A and a total thickness of the layer(s) B will be 10% or more but 50% or less. With this configuration, the coating properties can be further improved.

The compression molded article may be produced by compression molding the multilayer article for compression molding in such a way that a sum of a total thickness of the layer(s) A and a total thickness of the layer(s) B will be 15% or more but 40% or less. With this configuration, the coating properties can be further improved.

The method for producing the compression molded article according the present invention comprises compression molding the multilayer article for compression molding in such a way that a sum of a total thickness of the layer(s) A and a total thickness of the layer(s) B will be 10% or more but 69% or less. With such a method, it becomes possible to produce a compression molded article having an excellent coating property.

Effect of the Invention

According to the present invention, such a multilayer article for compression molding, which can express excellent coating properties after compression molding can be provided. Moreover, according to the present invention, it is possible to provide a compression molded article with excellent coating properties and a method for producing such a compression molded article.

BRIEF DESCRIPTION OF THE DRAWINGS

FIG. 1 is a schematic cross-sectional view for illustrating one example of a multilayer article for compression molding, a compression molded article, a method for producing a compression molded article according to an embodiment herein.

MODE FOR CARRYING OUT THE INVENTION

In the following, some embodiments according to the present invention will be described in detail. It should be noted that the present invention is not limited to the following embodiments.

A multilayer article for compression molding according to the present embodiment comprises at least one layer A and at least one layer B, a total thickness of the at least one layer A is 0.5% or more but 10% or less, and a total thickness of the at least one layer B is 90% or more but 99.5% or less, where a sum of the total thickness of the at least one layer A and the total thickness of the at least one layer B is 100%, and the at least one layer A is provided in such a way that a layer A is provided on at least one side of the multilayer article.

FIG. 1 is a schematic cross-sectional view for illustrating one example of a multilayer article for compression molding, a compression molded article, a method for producing a compression molded article according to an embodiment herein.

(a) and (b) of FIG. 1 each illustrate one example of a multilayer article for compression molding or a compression molded article according to the present invention.

A multilayer article 100 for compression molding illustrated in (a) of FIG. 1 comprises two layers A (10a and 10b), and one layer B (20). Moreover, the multilayer article 100 for compression molding is such that the layer A (10a) is provided on one side, and the layer A (10b) is provided on the other side. The layer A (10a) has a thickness $t_{11}$, the layer B (20) has a thickness $t_{12}$, and the layer A (10b) has a thickness $t_{13}$. A total thickness of the layers A (a sum of the thickness $t_{11}$ and the thickness $t_{13}$) is 0.5% or more but 10% or less, and the thickness of the layer B ($t_{12}$) is 90% or more but 99.5% or less, where a sum (thickness $t_{100}$) of the total thickness of the layers A (a sum of the thickness $t_{11}$ and the thickness $t_{13}$) and the thickness of the layer B ($t_{12}$) is 100%.

The multilayer article 100 for compression molding is illustrated as comprising a single layer B but may comprise a plurality of layers B. The multilayer article 100 for compression molding is illustrated as comprising two layers A but may comprise a single layer A or three or more layers A. In any cases, the multilayer article 100 for compression molding is such that a layer A is provided on at least one of the sides. Moreover, in cases where a plurality of layers A and a plurality of layers B are provided, the total thickness of the plurality of layers A is 0.5% or more but 10% or less, and a total thickness of the plurality of layers B is 90% or more but 99.5% or less, where a sum of the total thickness of the plurality of layers A and the total thickness of the plurality of layers B is 100%.

In the following, the layers A and the layer B according to the present embodiment will be described.

[Layer A]

The layers A contain a propylene polymer component (A1) (hereinafter, which may be referred to as "component A1"), a resin component (A2) having polar group(s) in its molecular chain described below (hereinafter, which may be referred to as "component A2"), and a thermoplastic elastomer component (A3) having no polar group(s) in its molecular chain described below (hereinafter, which may be referred to as "component A3") in such a way that a content of the component A1 is 20 wt % or more but 80 wt % or less, a content of the component A2 is 10 wt % or more but 50 wt % or less, and a content of the component A3 is 10 wt % or more but 30 wt % or less, where a total of the contents of the component A1, the component A2, and the component A3 is 100 wt %.

Examples of the component A1 comprise a propylene homopolymer and a propylene random copolymer containing a structural unit derived from propylene by 80 wt % or more. The propylene random copolymer may contain the structural unit derived from propylene by 85 wt % or more, or may contain structural unit derived from propylene by 90 wt % or more. The component A1 may be used solely or two or more of the component A1 may be used in combination.

The propylene homopolymer is a polymer comprising only a structural unit derived from propylene. Examples of the propylene homopolymer comprise a propylene homopolymer having an isotactic structure or a propylene homopolymer having a syndiotactic structure. The propylene homopolymer may be preferably a propylene homopolymer having an isotactic structure.

In case where the component A1 is a propylene homopolymer having an isotactic structure, an isotactic pentad fraction measured by using 13C-NMR (hereinafter, which may be referred to as [mmmm]) may be preferably 0.90 or more, or more preferably 0.95 or more.

Here, the isotactic pentad fraction indicates a fraction of an isotactic chain present in a pentad unit in a molecular chain measured by 13C-NMR, in other words, a fraction of the structural unit derived from propylene located at center of a chain in which five structural units derived from propylene are sequentially chained via meso bonding. More specifically, the isotactic pentad fraction is a value worked out as a fraction of a [mmmm] peak in the whole absorbance in peaks of methyl carbon regions observed by 13C-NMR spectrum. Here, the [mmmm] peak is a peak derived from propylene at the center of the chain of 5-units sequentially chained via meso bonding.

Note that this [mmmm] can be worked out according to the method described in the report by A. Zambelli et al. (Macromolecules, 1973, vol. 6).

In case where the component A1 is a propylene homopolymer having a syndiotactic structure, a syndiotactic pentad fraction measured by 13C-NMR method (hereinafter, which may be referred to as [rrrr]) may be preferably 0.85 or more, or more preferably 0.90 or more.

Here, the syndiotactic pentad fraction indicates a fraction of a syndiotactic chain present in a pentad unit in a molecular chain measured by 13C-NMR, in other words, a fraction of the structural unit derived from propylene located at center of a chain in which five structural units derived from propylene are sequentially chained via racemic form. More specifically, the isotactic pentad fraction is a value worked out as a fraction of a [rrrr] peak in the whole absorbance in peaks of methyl carbon regions observed by 13C-NMR spectrum. Here, the [rrrr] peak is a peak derived from propylene at the center of the chain of 5-units sequentially chained via racemic form.

Note that [rrrr] can be worked out by the method described in JP-A-2008-169316.

Examples of the propylene random copolymer comprise random copolymers comprising a structural unit derived from propylene and a structural unit derived from ethylene or a C4 to C10 α-olefin, and random copolymers comprising a structural unit derived from propylene, a structural unit derived from ethylene, and a structural unit derived from a C4 to C10 α-olefin.

Examples of the C4 to C10 α-olefins include 1-butene, isobutene, 1-pentene, 2-methyl-1-butene, 3-methyl-1-butene, 1-hexene, 2-methyl-1-pentene, 3-methyl-1-pentene, 4-methyl-1-pentene, 1-octene, 1-nonene, and 1-decene, among which 1-butene or 1-hexene is preferable.

Examples of the random copolymers comprising a structural unit derived from propylene and a structural unit derived from ethylene or a C4 to C10 α-olefin include propylene-ethylene random copolymer, propylene-(1-butene) random copolymer, propylene-isobutene random copolymer, propylene-(1-pentene) random copolymer, propylene-(2-methyl-1-butene) random copolymer, propylene-(3-methyl-1-butene) random copolymer, propylene-(1-hexene) random copolymer, propylene-(2-methyl-1-pentene) random copolymer, propylene-(3-methyl-1-pentene) random copolymer, propylene-(4-methyl-1-pentene) random copolymer, propylene-(1-octene) random copolymer, propylene-(1-nonene) random copolymer, and propylene-(1-decene) random copolymer. The random copolymers comprising a structural unit derived from propylene and a structural unit derived from ethylene or a C4 to C10 α-olefin may be preferably propylene-(1-butene) random copolymer, or propylene-(1-hexene) random copolymer.

Examples of the random copolymers comprising a structural unit derived from propylene, a structural unit derived from ethylene, and a structural unit derived from a C4 to C10 α-olefin include propylene-ethylene-1-butene) random copolymer, propylene-ethylene-isobutene random copolymer, propylene-ethylene-(1-pentene) random copolymer, propylene-ethylene-(2-methyl-1-butene) random copolymer, propylene-ethylene-(3-methyl-1-butene) random copolymer, propylene-ethylene-(1-hexene) random copolymer, propylene-ethylene-(2-methyl-1-pentene) random copolymer, propylene-ethylene-(3-methyl-1-pentene) random copolymer, propylene-ethylene-(4-methyl-1-pentene) random copolymer, propylene-ethylene-(1-octene) random copolymer, propylene-ethylene-(1-nonene) random copolymer, and propylene-ethylene-(1-decene) random copolymer. The random copolymers comprising the structural unit derived from propylene and the structural unit derived from ethylene or a C4 to C10 α-olefin may be preferably propylene-ethylene-(1-butene) random copolymer.

The random copolymers comprising the structural unit derived from propylene and the structural unit derived from ethylene or a C4 to C10 α-olefin is such that a content of the structural unit derived from propylene may be preferably 85 wt % or more but 99.9 wt % or less, or may be more preferably 90 wt % or more but 99.9 wt % or less. The random copolymers comprising the structural unit derived from propylene and the structural unit derived from ethylene or a C4 to C10 α-olefin is such that a content of the structural unit derived from ethylene or a C4 to C10 α-olefin is 20 wt % or less. The random copolymers comprising the structural unit derived from propylene and the structural unit derived from ethylene or a C4 to C10 α-olefin is such that the content of the structural unit derived from ethylene or a C4 to C10 α-olefin may be preferably 0.1 wt % or more but 15 wt % or less, or may be more preferably 0.1 wt % or more but 10 wt % or less. Here, the total amount of the random copolymers comprising the structural unit derived from propylene and the structural unit derived from ethylene or a C4 to C10 α-olefin is 100 wt %. The contents of the structural unit derived from propylene and the structural unit derived from ethylene or a C4 to C10 α-olefin can be worked out by 13C-NMR method.

The random copolymers comprising the structural unit derived from propylene, the structural unit derived from ethylene, and the structural unit derived from a C4 to C10 α-olefin is such that a content of the structural unit derived from propylene may be preferably 85 wt % or more but 99.9 wt % or less, or may be more preferably 90 wt % or more but 99.9 wt % or less. The random copolymers comprising the structural unit derived from propylene, the structural unit derived from ethylene, and the structural unit derived from a C4 to C10 α-olefin is such that a total of contents of the structural unit derived from ethylene, and the structural unit derived from a C4 to C10 α-olefin is 20 wt % or less. The random copolymers comprising the structural unit derived from propylene, the structural unit derived from ethylene, and the structural unit derived from a C4 to C10 α-olefin is such that the content of the structural unit derived from ethylene may be preferably 0.05 wt % or more but 7.5 wt % or less, or may be more preferably 0.05 wt % or more but 5 wt % or less. The random copolymers comprising the structural unit derived from propylene, the structural unit derived from ethylene, and the structural unit derived from a C4 to C10 α-olefin is such that the content of the structural unit derived from a C4 to C10 α-olefin may be preferably 0.05 wt % or more but 7.5 wt % or less, or may be more preferably 0.05 wt % or more but 5 wt % or less. Here, the random copolymers comprising the structural unit derived from propylene, the structural unit derived from ethylene, and the structural unit derived from a C4 to C10 α-olefin is 100 wt %. The contents of the structural unit derived from propylene, the structural unit derived from ethylene, and the structural unit derived from a C4 to C10 α-olefin can be worked out by 13C-NMR method.

A melting point of the component A1 worked out by differential scanning calorimetry (hereinafter, referred to as DSC) may be preferably 150° C. or higher, more preferably 155° C. or higher, or further preferably 160° C. or higher. Moreover, an enthalpy of fusion of the component A1 worked out by the DSC may be preferably 60 J/g or more, more preferably 80 J/g or more, or further preferably 90 J/g or more.

The melting point of the component A1 is a fusion temperature of a crystalline phase contained in the component A1. More specifically, the melting point of the component A1 is a peak top temperature at a heat absorption peak on a highest side of a DSC curve obtained when the component A1 is heated.

The enthalpy of fusion of the component A1 is a heat amount necessary for transiting the crystalline phase contained in the component A1 to a melting state, and as a concrete method, the enthalpy of fusion of the component A1 can be obtained as a sum of peak areas of all of heat absorption peaks of the DSC curve obtained when the propylene polymer component is heated.

Note that the melting point and the enthalpy of fusion of the component A1 are measured under the following conditions by using the DSC. (i) About 10 mg of the component A1 is subjected to heat treatment of 220° C. for 5 min under nitrogen atmosphere, and then cooled down to 50° C. at a cooling rate of 5° C./min. (ii) Next, after keeping at 50° C. for 1 min, the component A1 is heated at temperatures elevating from 50° C. to 180° C. at a heating rate of 5° C./min.

A melt mass flow rate of the component A1 measured at a temperature of 230° C. under a load of 2.16 kgf may be preferably 0.1 g/10 min or more but 5 g/10 min or less, more preferably 0.1 g/10 min or more but 2 g/10 min or less, or further preferably 0.1 g/10 min or more but 1 g/10 min or less. A smaller melt mass flow rate of the component A1 results in a greater bending elastic module of the compression molded article.

In this Description, the melt mass flow rate is a value measured according to JIS K6758.

The component A1 may be manufactured by a well-known polymerization method using a catalyst system formed by contacting a well-known solid titanium catalyst component an organic metal compound catalyst component, and if necessary an electron donor together; a catalyst system formed by contacting a group 4 transit metal compound having a cyclopentadienyl ring and an alkyl aluminoxane together; a catalyst system formed by contacting a group 4 transit metal compound having a cyclopentadienyl ring, a compound forming an ionic complex by reacting with the transition metal compound, and an organic aluminum compound together; or the like.

The component A1 may be one commercially available. Examples of commercially available component A1 include Noblen (Sumitomo chemical Co., Ltd., propylene copolymer) and the like.

The component A2 has a melt mass flow rate of 0.01 g/10 min or more but 1.49 g/10 min or less measured at a temperature of 190° C. under a load of 2.16 kgf and is a resin component having polar group(s) in its molecular chain. The component A2 may be used solely or two or more of the component A2 may be used in combination.

Examples of the polar group include maleic anhydride group, hydroxy group, carboxy group, epoxy group, cyano group, isocyanate group, vinyl group, acrylate group, and methacrylate group.

For the sake of a better coating property after the compression molding, the component A2 may be a resin having at least one polar group selected from the group consisting of a maleic anhydride group, a hydroxy group, a carboxy group, an epoxy group, a cyano group, an isocyanate group, a vinyl group, an acrylate group, and a methacrylate group, may be a resin having at least one polar group selected from the group consisting of a hydroxy group, an epoxy group, a cyano group, an isocyanate group, a vinyl group, an acrylate group, and a methacrylate group, may be a resin having at least one polar group selected from the group consisting of a maleic anhydride group, a hydroxy group, an epoxy group, a cyano group, a vinyl group, an acrylate group, and a methacrylate group, may be a resin having at least one polar group selected from the group consisting of an epoxy group, a vinyl group, an acrylate group, and a methacrylate group, or may be a resin having at least one polar group selected from the group consisting of an acrylate group, and a methacrylate group.

The component A2 may be a resin comprising a structural unit derived from a compound having polar group(s) and a structural unit derived from another compound such as ethylene, propylene, butene, pentene, hexene, octene, or styrene.

Examples of the component A2 include an ethylene-ethyl methacrylate copolymer, an ethylene-methyl methacrylate copolymer, an ethylene-vinyl acetate copolymer, an epoxy copolymer, a hydroxyethyl methacrylate copolymer, an acrylonitrile copolymer, an ethylene-acrylonitrile copolymer, a urethane copolymer, a maleic acid-modified propylene copolymer, and the like.

For the sake of a better coating property after the compression molding, the component A2 may contain the structural unit derived from the compound with the polar group by 5 wt % or more but 50 wt % or less, by 5 wt % or more but 40 wt % or less, or by 5 wt % or more but 35 wt % or less.

In the component A2, the content of the structural unit derived from the compound with the polar group can be quantitatively determined, for example, by preparing a sample by dissolving the resin content in N,N-dimethyl formamide (DMF)-d7 to make up a concentration of 20 to 30 mg/ml, and measuring the sample by 13C-NMR spectroscopy.

The component A2 may be a copolymer containing the structural unit derived from the compound with the polar group by 5 wt % or more but 50% or less, and the structural unit derived from ethylene by 50 wt % or more but 95 wt % or less, may be a copolymer containing the structural unit derived from the compound with the polar group by 5 wt % or more but 40% or less, and the structural unit derived from ethylene by 60 wt % or more but 95 wt % or less, or may be a copolymer containing the structural unit derived from the compound with the polar group by 5 wt % or more but 35% or less, and the structural unit derived from ethylene by 75 wt % or more but 95 wt % or less.

In case where the component A2 contains the structural unit derived from ethylene, the content of the structural unit derived from ethylene can be measured, for example, by the IR method or NMR method described in "Shin-ban, Koubunnshi Bunseki Handbook (New-Edition, Polymer Analysis Handbook)" (Edited by The Japan Society for Analytical Chemistry, in The Chemical Society of Japan, published by KINOKUNIYA COMPANY, LTD (1995).

A melt mass flow rate of the component A2 measured at a temperature of 190° C. under a load of 2.16 kgf may be preferably 1.4 g/10 min or less, more preferably 1.3 g/10 min or less, or further preferably 1 g/10 min or less, for the sake of better coating properties.

The component A2 may be produced, for example, by polymerizing, in the presence of a polymerization catalyst, the compound with the polar group, and another compound as needed. Examples of the polymerization catalyst include organic phosphate compounds such as 2-ethyl hexyl phosphate, octyl phosphate, and dioctyl phosphate, and mixtures of these organic phosphate compounds.

The component A2 may be one commercially available. Examples of such a component A2 commercially available includes NOVATEC (Japan Polyethylene Corporation, ethylene-vinyl acetate copolymer), SUNTEC (Asahi Kasei Corporation, ethylene-vinyl acetate copolymer), REX-PEARL ((Japan Polyethylene Corporation, ethylene-methyl acrylate), and the like.

The component A3 has a melt mass flow rate of 4 g/10 min or less measured at a temperature of 190° C. under a load of 2.16 kgf and is a thermoplastic elastomer component having no polar group(s) in its molecular chain. The component A3 may be used solely or two or more of the component A2 may be used in combination.

Examples of the component A3 include olefin-based elastomers and styrene-based elastomers. The component A3 may be an olefin-based elastomer or a styrene-based elastomer, for the sake of better coating properties after compression molding.

Examples of the olefin-based elastomer include a copolymer comprising a structural unit derived from propylene or a C4 to C10 α-olefin, and a structural unit derived from ethylene.

Examples of the C4 to C10 α-olefins include 1-butene, isobutene, 1-pentene, 2-methyl-1-butene, 3-methyl-1-butene, 1-hexene, 2-methyl-1-pentene, 3-methyl-1-pentene, 4-methyl-1-pentene, 1-octene, 1-nonene, and 1-decene.

The propylene or C4 to C10 α-olefin may be preferably propylene, 1-butene, 1-hexene, or 1-octene, or more preferably propylene or 1-butene.

The olefin-based elastomer may comprise two or more kinds of the structural unit derived from propylene or the C4 to C10 α-olefin.

The olefin-based elastomer may comprise a structural unit derived from another monomer without a polar group, in addition to the structural unit derived from propylene or a C4 to C10 α-olefin, and the structural unit derived from ethylene. Examples of the other monomer without a polar group include C4 to C8 conjugated dienes such as 1,3-butadiene, 2-methyl-1,3-butadiene (isoprene), 1,3-pentadiene, and 2,3-dimethyl-1,3-butadiene; and dicyclopentadiene, 5-ethylidene-2-norbornene,1,4-hexadiene, 1,5-dicyclopentadiene, and 7-methyl-1,6-octadiene. The olefin-based elastomer may comprise two or more kinds of the structural unit derived from the other monomer without a polar group.

Examples of the olefin-based elastomer include ethylene-propylene copolymer, ethylene-(1-butene) copolymer, ethylene-(1-hexene) copolymer, ethylene-(1-octene) copolymer, ethylene-propylene-(1-butene) copolymer, ethylene-propylene-(1-hexene copolymer), ethylene-propylene-(1-octene) copolymer, ethylene-propylene-(5-ethylidene-2-norbornene) copolymer, ethylene-propylene-dicyclopentadiene copolymer, ethylene-propylene-(1,4-hexadiene) copolymer, and ethylene-propylene-(5-vinyl-2-norbornene copolymer). The olefin-based elastomer may be employed solely or a combination of two or more kinds of the olefin-based elastomer may be employed.

The olefin-based elastomer may be preferably ethylene-propylene copolymer, ethylene-(1-butene) copolymer, ethylene-(1-hexene) copolymer, ethylene-(1-octene) copolymer, or ethylene-propylene-(5-ethylidene-2-norbornene) copolymer, or more preferably ethylene-propylene copolymer, or ethylene-(1-butene) copolymer.

For the sake of a better coating property after compression molding, the component A3 may be an elastomer comprising the structural unit derived from propylene or a C4 to C10 α-olefin and the structural unit derived from ethylene, or may be an elastomer comprising the structural unit derived from propylene or a C4 to C6 α-olefin and the structural unit derived from ethylene.

The content of the structural unit derived from ethylene in the olefin-based elastomer may be preferably 30 wt % or more but 95 wt % or less, or more preferably 40 wt % or more but 80 wt % or less. The content of the structural unit derived from propylene or a C4 to C10 α-olefin in the olefin-based elastomer may be preferably 5 wt % or more but 70 wt % or less, or more preferably 20 wt % or more but 60 wt % or less. Here, the total amount of the structural unit derived from ethylene and the structural unit derived from propylene or a C4 to C10 α-olefin in the olefin-based elastomer is 100 wt %.

The content of the ethylene unit in the olefin-based elastomer can be determined on the basis of the report by Kakugo et al. (Macromolecules, 1982, 15, 1150-1152) from 13C-NMR spectrum measured under the following conditions.

In a test tube of 10 mmΦ, about 200 mg of the olefin-based elastomer is dissolved in 3 ml of ortho-dichlorobenzene uniformly to prepare a sample, and 13C-NMR spectrum of the sample is measured with a measurement temperature of 135° C., pulse repetition time of 10 sec, a pulse width of 45°, and the number of scans of 2500 times. The content of the structural unit derived from the compound other than ethylene can be quantitatively determined, for example, by preparing a sample by dissolving the olefin-based elastomer in N,N-dimethyl formamide (DMF)-d7 to make up a concentration of 20 to 30 mg/ml, and measuring the sample by 13C-NMR spectroscopy.

In case where the component A3 contains the structural unit derived from propylene, the content of the structural unit derived from propylene is generally less than 80 wt %. In case where the component A3 contains the structural unit derived from propylene, the content of the structural unit derived from propylene may be 70 wt % or less, or 50 wt % or less. That is, the olefin-based elastomer as the component A3 is such that the content of the structural unit derived from propylene may be less than 80 wt %, 70 wt % or less, or 50 wt % or less. The content of the content of the structural unit derived from propylene can be determined, for example, by the 13C-NMR method.

Examples of the styrene-based elastomer include a block copolymer comprising a structural unit derived from a vinyl aromatic compound and a structural unit derived from a conjugated diene, and a hydrogenated block copolymer in which a double bond derived from the conjugated diene of the aforementioned block copolymer is hydrogenated. The styrene-based elastomer may preferably a block copolymer comprising a structural unit derived from a vinyl aromatic compound and a structural unit derived from a conjugated diene in such a way that 80% or more of the double bond derived from the conjugated diene is hydrogenated, or more preferably such a block copolymer in which 85% or more of the double bond derived from the conjugated diene is hydrogenated.

Examples of the styrene-based elastomer include block copolymers such as styrene-ethylene-butene-styrene rubber (SEBS), styrene-ethylene-propylene-styrene rubber (SEPS), styrene-butadiene rubber (SBR), styrene-butadiene-styrene rubber (SBS), and styrene-isoprene-styrene rubber (SIS), and such block copolymers hydrogenated.

A melt mass flow rate of the component A3 measured at a temperature of 190° C. under a load of 2.16 kgf may be preferably 3 g/10 min or less, less than 1 g/10 min, or 0.8 g/10 or less, for the sake of a better coating property. The melt mass flow rate of the component A3 measured at a temperature of 190° C. under a load of 2.16 kgf may be, for example, 0.01 g/10 min or more, or 0.1 g/10 min or more, for the sake of a better coating property.

The component A3 may be produced by a well-known polymerization method with a well-known catalyst. The catalyst usable for the olefin-based elastomer comprises a catalyst system comprising vanadium compound and an organic aluminum compound, a Ziegler-Natta catalyst system, and a metallocene catalyst. Examples of the polymerization method include solution polymerization, slurry polymerization, high-pressure ion polymerization, gas-phase polymerization, and the like.

The component A3 may be one commercially available. Examples of the component A3 commercially available include ENGAGE ENR7487 (Dow DuPont Elastomer, Inc., ethylene-(1-butene) copolymer, product name), TAFMER P0775 (Mitsui Chemicals, Inc., ethylene-propylene copolymer, product name), EXCELLEN CX5505 (Sumitomo Chemical Co., Ltd., ethylene-(1-butene) copolymer), and the like.

The content of the component A1 contained in the layer A may be 25 wt % or more, or 30 wt % or more. The content of the component A1 contained in the layer A may be 70 wt % or less, or 60 wt % or less. The content of the component A2 contained in the layer A may be 20 wt % or more. The content of the component A2 contained in the layer A may be 45 wt % or less. The content of the component A3 contained in the layer A may be 20 wt % or more. The content of the component A3 contained in the layer A may be 25 wt % or less. Here, the total of the content of the component A1, the content of the component A2, and the content of the component A3 is 100 wt %.

[Layer B]

The layer B comprises a propylene polymer component (B1) (hereinafter, which may be referred to as "component B1"), and an inorganic filler (B2) (hereinafter, which may be referred to as "component B2") in such a way that a content of the component B1 is 50 wt % or more but 80 wt % or less, and a content of the component B2 is 20 wt % or more but 50 wt % or less, where a total of the contents of the component B1 and the component B2 is 100 wt %.

The component B1 may be one similar to the component A1 contained in the layer A.

For the sake of a better coating property after the compression molding, it is preferable that the component (B2) satisfies all of requirement (1-a) described below, requirement (1-b) described below, and requirement (1-c) described below.

Requirement (1-a):
Median diameter D50 (L) measured by centrifugal sedimentation method according to JIS R1629 is 10 μm or more but 25 μm or less.

Requirement (1-b):
Median diameter D50 (S) measured by centrifugal sedimentation method according to JIS R1619 is 2 μm or more but 8 μm or less.

Requirement (1-c):
An aspect ratio constant calculated out by equation (1) is 2 or more but 15 or less.

$$\text{Aspect ratio constant} = \{D50(L) - D50(S)\}/D50(S) \quad (1).$$

The component B2 may be used solely or two or more of the component B2 may be used in combination.

(Median Diameter D50 (L) Measured by Laser Diffraction Method)

Median diameter D50 (L) is worked out by performing measurement according to JIS R 1629 using a laser particle size distribution analyzer to obtain a cumulative particle size distribution curve, and reading out a particle size of 50 wt % of a cumulative amount from the cumulative particle size distribution curve. Examples of the laser particle size distribution analyzer include MT-3300Ex-II (Nikkiso Co., Ltd.).

The median diameter D50 (L) of the component B2 measured by the laser diffraction method according to JIS R 1629 may be 22 μm or less, 20 μm or less, or 18 μm or less for the sake of a better shock resistance of the compression molded article obtained from the multilayer article for compression molding.

(Median Diameter D50 (S) Measured by Centrifugal Sedimentation Method)

Median diameter D50 (S) is worked out by performing measurement according to JIS R 1619 using a centrifugal sedimentation size distribution analyzer to obtain a cumulative particle size distribution curve, and reading out a particle size of 50 wt % of a cumulative amount from the cumulative particle size distribution curve. Examples of the centrifugal sedimentation size distribution analyzer include SA-CP3 (Shimadzu Corporation).

The median diameter D50 (S) of the component B2 measured by the centrifugal sedimentation size distribution analyzer according to JIS R 1629 may be 6 µm or less, 5 µm or less, or 4 µm or less.

(Aspect Ratio Constant)

The aspect ratio constant can be worked out by the Equation (1) from the median diameter D50 (L) and the median diameter D50 (S). The aspect ratio constant of the component B2 may be 2.1 or more but 10 or less, or 2.2 or more but 9 or less, or 2.3 or more but 8 or less.

Examples of the component B2 include mica, glass flakes, glass fibers, and talc.

The component B2 may be talc for the sake of better coating properties after compression molding.

The component B2 may be produced, for example by the method described in U.S. Pat. No. 6,348,536 Specification. The component B2 may be one commercially available. Examples of the component B2 commercially available include HAR W92 (Imerys, talc, product name), HAR T84 (Imerys, talc, product name), and the like.

A content of the component B1 contained in the layer B may be preferably 66 wt % or more but 74 wt % or less, more preferably 67 wt % or more but 73 wt % or less, or further preferably 68 wt % or more but 72 wt % or less. A content of the component B2 contained in the layer B may be preferably 26 wt % or more but 34 wt % or less, more preferably 27 wt % or more but 33 wt % or less, or further preferably 28 wt % or more but 32 wt % or less. Here, the total of the content of the component B1 and the content of the component B2 is 100 wt %.

Examples of a method for mixing the components constituting the layer A and the layer B comprise a method comprising melting, mixing, and kneading the components by a mixing device such as a single-screw extruder, a twin-screw extruder, a Banbury mixer, a heat roll, or the like, a method comprising these components in the polymerization reaction for producing the component A1, the component A2, the component A3, or the component B1, and the like method.

As a method of producing the layer A and the layer B, a press molding method, an extrusion molding method, and an injection molding method are exemplified.

In the multilayer article for compression molding according to the present embodiment, the total thickness of the layer(s) A is preferably 3% or more but 9.5% or less, and the total thickness of the layer(s) B is 90.5% or more but 97% or less, where a sum of the total thickness of the layer(s) A and the total thickness of the layer(s) B is 100%.

The multilayer article for compression molding according to the present embodiment may further comprise a layer other than the layer A and the layer B.

The multilayer article for compression molding may comprise an additive of various kinds or a crystal nucleating agent.

Examples of the additive include an anti-oxidant, an ultraviolet ray absorbing agent, an anti-static agent, a lubricant, an adhesive agent, an anti-clouding agent, and a blocking agent.

Examples of the crystal nucleating agent include α-crystal nucleating agents such as a sorbitol-based nucleating agent, an organic ester phosphate metal salt-based compound, an organic carboxylic acid metal salt-based compound, and a rosin-based compound, and β-crystal nucleating agents such as amid-based compound and quinacridone-based compound. A content of the crystal nucleating agent may be preferably 0.001 parts by weight or more for the sake of the effect of addition, where the multilayer article for compression molding is 100 parts by weight, and the content of the crystal nucleating agent may be preferably 1.5 parts by weight or less for the sake of preventing deterioration of dispersion ability of the crystal nucleating agent, where the multilayer article for compression molding is 100 parts by weight.

The multilayer article for compression molding may be produced by extrusion molding for co-extruding the layer A and the layer B.

The above-described multilayer article for compression molding can express excellent coating properties after compression molding.

[Compression Molded Article]

The compression molded article may be produced, for example, by compression molding in which the multilayer article for compression molding is compression molded under thermal compression in the thickness direction of the multilayer article.

The compression molded article according the present embodiment is produced by compression molding the multilayer article for compression molding in such a way that a sum of a total thickness of the layer(s) A and a total thickness of the layer(s) B will be 10% or more but 69% or less. That is, the compression molded article is produced by compression molding the multilayer article for compression molding in such a way that the sum of the total thickness of the layer(s) A and the total thickness of the layer(s) B after compression molding will be 10% or more but 69% or less, where the sum of the total thickness of the layer(s) A and the total thickness of the layer(s) B in the multilayer article before compression molding (the multilayer article for compression molding) is 100%. Such a compression molded article has excellent coating properties. Moreover, such a compression molded article is low in thermal deformation, and therefore it is considered that deformation of such a compression molded article is difficult to occur even when coating is bake-finished. The sum (%) of the total thickness of the layer(s) A and the total thickness of the layer(s) B in the multilayer article after compression molding (compression molded article) may be referred to as a compression rate, where the sum of the total thickness of the layer(s) A and the total thickness of the layer(s) B in the multilayer article before compression molding (the multilayer article for compression molding) is 100%. Note that, even in case where the multilayer article for compression molding comprises the layer other than the layer(s) A and the layer(s) B, the compression rate is calculated out from the thicknesses of the layer(s) A and the layer(s) B.

In other words, the calculation of the compression rate is not affected by a thickness of the other layer.

Concreate examples of the compression molded article according to the present embodiment will be described herein, referring to FIG. 1.

A compression molded article 200 illustrated in (b) of FIG. 1 is obtained by compression molding a multilayer article 100 for compression molding illustrated in (a) of FIG. 1 in such a way that the sum of the total thickness of the layers A and the total thickness of the layer B will be 10% or more but 69% or less. That is, the compression molded article 200 is such that the sum of the total thickness (the sum of $t_{21}$ and $t_{23}$) of the layers A ($10a$ and $10b$) and the total thickness (thickness $t_{200}$) of the thickness $t_{22}$ of the layer B

(20) in the compression molded article 200 is 10% or more but 69% or less with respect to the sum of the total thickness (the sum of $t_{11}$ and $t_{13}$) of the layers A (10a and 10b) and the total thickness (thickness $t_{100}$) of the thickness $t_{12}$ of the layer B (20) in the multilayer article 100 for compression molding.

The compression molded article according the present embodiment may be one produced by compression molding the multilayer article for compression molding in such a way that the sum of a total thickness of the layer(s) A and the total thickness of the layer(s) B will be 10% or more but 50% or less, or 15% or more but 40% or less. In other words, the compression rate may be 10% or more but 50% or less, or 15% or more but 40% or less.

The compression molded article may be preferably configured such that the component B2 contained in the compression molded article is oriented in such a way that a surface of the component B2 perpendicular to the thickness of the component B2 is parallel with a direction in which the components contained in the multilayer article for compression molding flow when being thermally compressed.

The orientation state of the component B2 in the compression molded article can be evaluated by measuring wide angle X-ray diffraction in the compression molded article.

The orientation of the component B2 can be quantitatively determined based on degree of orientation of the component B2. The degree of orientation of the component B2 can be determined by the following equation (2) using full width at half maximum of an azimuth strength distribution of a lattice plane perpendicular to the thickness direction of the component B2 of a 2-dimensional wide angle X-ray scattering image. Here, a scattering angle width for the calculation of the azimuth strength distribution is a range of ±0.5° with respect to a diffraction peak position derived from the lattice plane.

$$\text{Degree of orientation}(\%)=\{(180-hwd)/180\}\times 100 \quad (2)$$

(where hwd represents the full width at half maximum (unit: angle) in the azimuth strength distribution of the lattice plane perpendicular to the thickness direction of the component B2.)

With a greater degree of orientation, it can be said that the plane of the component B2 is oriented more parallelly with the direction in which the components contained in the multilayer article for compression molding flow when being thermally compressed.

The degree of orientation of the component B2 contained in the compression molded article may be, for example, 80% or more, or preferably 85% or more for the sake of a better shock resistance.

The component B1 generally has crystalline property and therefore atoms in the crystal are arranged with a 3-dimensional arrangement repeated periodically. Thus, in consideration of the periodicity, it is considered that the crystal is such that parallelepipeds with a constant structure are laminated 3-dimensionally. Such parallelepipeds are referred to as unit lattices.

Three sides of the unit lattice are referred to as a axis, b axis, and c axis, respectively. In a unit lattice of the α-crystal polypropylene crystal, a molecular chain direction is the c axis, and a shorter one of the other two crystal axes is the a axis, and a longer one of the other two crystal axes is referred to as the b axis.

In the compression molded article according to the present embodiment, it is preferable that the component B1 have a crystalline structure and the crystalline structure be such that the c axis or the a axis of the α crystal is oriented parallelly to the direction of flowing occurring at the thermal compression. With such a configuration in which the c axis or the a axis of the α crystal of the component B1 is oriented parallelly with the direction in which the components contained in the multilayer article for compression molding flow at the thermal compression, the compression molded article can have a greater shock resistance.

The orientation state of the crystal of the component B1 can be evaluated by measuring wide angle X-ray diffraction in the compression molded article.

The orientation of the crystal of the component B1 can be quantitatively determined based on degree of orientation of the crystal. The degree of orientation of the crystal can be determined by the following equation (3) using full width at half maximum of an azimuth strength distribution of a (040) plane of a 2-dimensional wide angle X-ray scattering image. Here, a scattering angle width for the calculation of the azimuth strength distribution is a range of ±0.5° with respect to a diffraction peak position derived from the (040) plane.

$$\text{Degree of orientation of crystal}(\%)=\{(180-hw_{040})/180\}\times 100 \quad (3)$$

(where $hw_{040}$ represents the full width at half maximum (unit: angle) in the azimuth strength distribution of the (040) plane of the α-crystal of the component B1.)

With a greater degree of orientation of the crystal, it can be said that the c axis or the a axis of the α crystal of the component B1 is oriented more parallelly with the direction in which the components contained in the multilayer article for compression molding flow when being thermally compressed.

The degree of orientation of the crystal of the component B1 contained in the compression molded article may be, for example, 75% or more, or preferably 80% or more.

The compression molded article according to the present embodiment may be produced, for example, by compression molding in which the multilayer article for compression molding is rolled with the aforementioned compression rate. That is, the method for producing the compression molded article according the present embodiment may comprise compression molding the multilayer article for compression molding in such a way that a sum of a total thickness of the layer(s) A and a total thickness of the layer(s) B will be 10% or more but 69% or less. With such a method, it becomes possible to produce a compression molded article having an excellent coating property.

The step of compression molding may be, for example, a step of performing the thermal compression at a temperature near the melting point of the component B1.

The thermal compression of the multilayer article for compression molding is such that a device for performing the thermal compression has a pressuring unit configured to contact with the multilayer article for compression molding and a temperature of the pressuring unit in performing the thermal compression is a temperature near the melting point (Tm) of the component B1 and is preferably a temperature not less than the melting temperature (Tm)−20° C. but not more than the melting temperature (Tm)+10° C., or more preferably a temperature not less than the melting temperature (Tm)−10° C. but not more than the melting temperature (Tm)+5° C.

Duration of the thermal compression of the multilayer article for compression molding may be preferably 15 sec or longer but 60 min or shorter, more preferably 1 min or longer but shorter than 30 min, or further preferably 10 min or longer but shorter than 15 min, for the sake of attaining a better shock resistance of the compression molded article, or for the sake of preventing thermal deterioration of the components contained in the multilayer article for compression molding.

Examples of the device for performing the thermal compression of the multilayer article for compression molding include a press molding device with a temperature adjusting function, a hot-press molding of a track belt type, a belt-type sealer capable of pressing, and a compression and roll molding device. Moreover, as a method of performing the thermal compression, it is preferable to thermally compress the multilayer article for compression molding in the thickness direction by using a press molding device with a temperature adjusting function.

In view of the load of the load onto the device in achieving a higher compression rate, and for the sake of attaining a compression molded article of a larger size, such a press molding device with a temperature adjusting function is preferable. With such a molding device, it is easy to obtain a compression molded article with such a large size exceeding 40 cm in length at at least one point viewed from the above.

The method of performing the thermal compression of the multilayer article for compression molding may further comprising applying a lubricant to the pressuring unit of the device for performing the thermal compression, the pressing unit being configured to contact with the multilayer article for compression molding. Examples of the lubricant include silicone oil. The application of the lubricant can reduce friction resistance between the multilayer article for compression molding and the pressuring unit, and thereby perform the thermal compression of the multilayer article for compression molding more smoothly, which can lead to improvement of molding cycles and load reduction of the device for performing the thermal compression.

The compression molded article according to the present embodiment may be further formed into a desired shape by using a well-known method such as vacuum forming, pressure forming, or press forming.

The compression molded article according to the present embodiment can be used as a multi-layer structure with another resin, metal, paper, or leather adhered thereto.

EXAMPLES

Hereinafter, the present invention will be described, referring to Examples and Comparative Examples. Propylene polymer components, resin contents with a polar group in their molecular chains, thermoplastic elastomer component without a polar group in their chains, and inorganic fillers used in the Examples and Comparative Examples are listed below.

(1) Propylene Polymer Components

Propylene homopolymers as below were prepared by gas-phase polymerization with a catalyst as described in JP-A-H10-2123219, and controlled hydrogen concentration and polymerization temperature inside a polymerization reaction vessel.

(A1-1) Propylene Homopolymer (Component A1)
  MFR (230° C., under load of 2.16 kg): 0.5 g/10 min.
  Isotactic pentad fraction: 0.977
  Meting point: 163° C.
  Enthalpy of fusion: 106 J/g
(B1-1) Propylene Homopolymer (Component B1)
  MFR (230° C., under load of 2.16 kg): 0.5 g/10 min.
  Isotactic pentad fraction: 0.977
  Meting point: 163° C.
  Enthalpy of fusion: 106 J/g (2) Resin Components with a Polar Group in their Molecular Chains
(A2-1) Ethylene-Methyl Methacrylate Copolymer (Component A2)
  MFR (190° C., under load of 2.16 kg): 0.25 g/10 min.
  Content of methyl methacrylate: 17 wt %
  Content of ethylene: 83 wt %
(A2-2) Ethylene-Methyl Methacrylate Copolymer
  MFR (190° C., under load of 2.16 kg): 2.0 g/10 min.
  Content of methyl methacrylate: 20 wt %
  Content of ethylene: 80 wt %
(A2-3) Ethylene-Methyl Methacrylate Copolymer
  MFR (190° C., under load of 2.16 kg): 7 g/10 min.
  Content of methyl methacrylate: 15 wt %
  Content of ethylene: 85 wt,
(A2-4) Ethylene-Vinyl Acetate Copolymer (Component A2)
  MFR (190° C., under load of 2.16 kg): 0.41 g/10 min.
  Content of vinyl acetate: 5 wt %
  Content of ethylene: 95 wt %
(3) Thermoplastic Elastomer Component without a Polar Group in their Molecular Chains
(A3-1) Ethylene-(1-Butene) Copolymer (Component A3)
  (Product Name) ENGAGE ENR7487: Dow DuPont Elastomer, Inc.
  MFR (190° C., under load of 2.16 kg): 0.5 g/10 min.
  Content of ethylene: 74 wt %
  Content of 1-butene: 26 wt %
(A3-2) Ethylene-(1-Butene) Copolymer
  (Product Name) ENGAGE ENR7447: Dow DuPont Elastomer, Inc.
  MFR (190° C., under load of 2.16 kg): 5 g/10 min.
  Content of ethylene: 70 wt %
  Content of 1-butene: 30 wt %
(A3-3) Ethylene-Propylene-Diene Copolymer (Component A3)
  MFR (230° C., under load of 2.16 kg): 0.6 g/10 min.
  Content of ethylene: 67 wt %
  Content of propylene-diene: 33 wt %
(A3-4) Ethylene-Propylene Copolymer (Component A3)
  (Product name) TAFMER P0775 (Mitsui Chemicals, Inc.)
  MFR (230° C., under load of 2.16 kg): 0.6 g/10 min.
  Content of ethylene: 71 wt %
  Content of propylene: 29 wt %
(4) Inorganic Filler
(B2-1) Talc (Component B2)
  (Product name) HAR W92: Imerys
  D50 (L): 11 μm
  D50 (S): 2.5 μm
  Aspect Ratio Constant: 3.4

Properties of the ingredient components and compression molded article (hereinafter, which may be referred to as "multilayer plate") were measured according to the following method.

(1) Melt Mass Flow Rate (MFR, unit: g/10 min)

The melt mass flow rates were measured according to the method stipulated in JIS K6758. The measurement was carried out at a measurement temperature of 230° C. or 190° C. with a load of 2.16 kg.

(2) Isotactic Pentad Fraction ([Mmmm])

In a test tube of 10 mm in diameter, about 200 mg of a resin sample was dissolved in 3 ml of ortho-dichlorobenzene completely to prepare a sample, and 13C-NMR spectrum of the sample was measured. Measurement conditions of the 13C-NMR spectrum are listed below.

<Measurement Conditions>
  Device: Bruker Avance 600
  Measurement temperature: 135° C.

Pulse repetition time: 10 seconds
Pulse width: 45°
Number of scans: 2500 times

From measurement results, [mmmm] was worked out according to the method described in the report by A. Zambelli et al. (Macromolecules, 1973, vol. 6, p 925 to p 926).

(3) Melting Point (Tm, Unit: ° C.) and Enthalpy of Fusion (ΔH, Unit: J/g)

The propylene polymer component was subjected to hot press molding (after preheating at 230° C. for 5 min, the pressure was increased to 5.0 MPa over 1 min, and then the propylene polymer component was kept at the pressure for 2 min, and then cooled at 30° C. under 5.0 MPa for 5 min), thereby preparing a sheet of about 0.5 mm in thickness. By using a differential scanning calorimeter (PerkinElmer Co., Ltd., Diamond DSC), the melting point and the enthalpy of fusion of the propylene polymer components were measured. Measurement conditions are listed below.

<Measurement Conditions>

The sheet thus prepared of 10 mg was subjected to heat treatment of 220° C. for 5 min under nitrogen atmosphere, and cooled down to 50° C. at a cooling rate of 5° C./min, and kept at 50° C. for 1 min, and then heated from 50° C. to 180° C. at a heating rate of 5° C./min.

<Calculation Methods for Tm and ΔH>

Tm (° C.) is a peak top temperature at a heat absorption peak on a highest side of a DSC curve obtained when DSC was heated. Moreover, ΔH (J/g) is a peak area of the whole peaks derived from heat absorption of the DSC curve.

(4) Content of the Structural Unit Derived from Methyl Methacrylate

The content of methyl methacrylate unit in the resin component with a polar group in its molecular chain can be measured by preparing a press sheet of 0.3 mm in thickness and measuring the sheet by infrared absorption spectrum analysis using an infrared spectrometer. As characteristic absorption of the infrared absorption spectrum, a peak at 3448 $cm^{-1}$ belonging to methyl methacrylate was used, and the content of the comonomer was worked out according to the following equation with the absorption corrected by the thickness.

$$MMA=4.1\times\log(I0/I)/t-5.3$$

[where, MMA is the content of methyl methacrylate (wt %), I is transmission light strength at the frequency of 3448 $cm^{-1}$, I0 is incident light strength at the frequency of 3448 $cm^{-1}$, and t is the thickness (cm) of the sample sheet measured.]

(5) Content of the Structural Unit Derived from Vinyl Acetate

The content of the structural unit derived from vinyl acetate of the resin component with a polar group in its molecular chain was measured according to JIS K6924-2: 1997.

(6) Content of the Structural Unit Derived from Ethylene

The content of the structural unit derived from ethylene of the resin component with a polar group in its molecular chain was measured according to the following method.

In a test tube of 10 mm in diameter, about 200 mg of a resin sample was dissolved in 3 ml of ortho-dichlorobenzene completely to prepare a sample, and 13C-NMR spectrum of the sample was measured. Measurement conditions of the 13C-NMR spectrum are listed below.

<Measurement Conditions>
Device: Bruker Avance 600
Measurement temperature: 135° C.
Pulse repetition time: 10 seconds
Pulse width: 450
Number of scans: 2500 times The content of the structural unit derived from ethylene in the thermoplastic elastomer without a polar group in its molecular chain was measured according to the following method.

In a test tube of 10 mm in diameter, about 200 mg of a resin sample was dissolved in 3 ml of ortho-dichlorobenzene completely to prepare a sample, and 13C-NMR spectrum of the sample was measured. Measurement conditions of the 13C-NMR spectrum are listed below.

<Measurement Conditions>
Device: Bruker Avance 600
Measurement temperature: 135° C.
Pulse repetition time: 10 seconds
Pulse width: 450
Number of scans: 2500 times From measurement results, the content of the structural unit derived from ethylene was calculated out according to the method described in the report of M. Kakugo et al. (Macromolecules, 1982, vol. 15, p 1150 to p 1152). Moreover, the contents of the structural units derived from 1-butene, propylene-diene, and propylene in the resin component without a polar group in their molecular chains were calculated out by deducting the content of the structural unit derived from ethylene from 100 wt %.

(7) Median Diameter D50 (L) Measured by Laser Diffraction Method

Median diameter D50 (L) measured by the laser diffraction method was worked out by the following method.

A sample dispersed in ethanol by using a homogenizer was measured according to JIS R1629 using a micro-track particle size analyzer (Nikkiso Co., Ltd, MT-3300EX II), and D50 (L) was worked out from a particle size value of 50 wt % of a cumulative amount read out from a cumulative particle size distribution curve.

(8) Median Diameter D50 (S) Measured by Centrifugal Sedimentation Method

The median diameter D50 (S) measured by the centrifugal sedimentation method was worked out by the following method. A sample dispersed in ethanol by using an ultrasonic washing device was measured according to JIS R1619 using a centrifugal sedimentation size distribution analyzer (Shimadzu Corporation, "SA-CP3"), and D50 (S) was worked out from a particle size value of 50 wt % of a cumulative amount read out from a cumulative particle size distribution curve.

(9) Aspect Ratio Constant

The aspect ratio constant was worked out by the Equation (1) from the value of the median diameter D50 (L) and the value of the median diameter D50 (S).

$$\text{Aspect ratio constant}=\{D50(L)-D50(S)\}/D50(S) \qquad (1).$$

(10) Compression Rate

The thickness of the multilayer article for compression molding in which the layers A and the layer B were laminated and the thickness of the multilayer plate after the compression molding were measured and the compression rate was calculated out according to the following equation.

Compression rate (%)=the thickness (mm) of the multilayer plate after the compression molding/the thickness (mm) of the multilayer article for compression molding×100

(11) Waterproof Adhesiveness

<Coating Condition (I)>

A test piece of 150 mm in length, 70 mm in width, and 2.5 mm in thickness was cut out from the multilayer plate thus obtained. On a surface of the test piece, a primer (Kansai Paint Co., Ltd., CLEAR WHITE (NE) was sprayed (film thickness 6 µm after dried) by using a reciprocator (Carlisle Fluid Technologies Ransburg Japan KK, RIH1200H035), and dried at 60° C. for 3 min. After that, an aqueous baseYcoat (Kansai Paint Co., Ltd. 202 Sun Metallic) was sprayed thereon (film thickness 20 µm after dried) using the same device and dried at 60° C. for 3 min. On top of that, clear paint (comprising HS clear base main agent made by Kansai Paint Co., Ltd., and HS clear G curing agent made by Kansai Paint Co., Ltd., and thinner 30 made by Kansai Paint Co., Ltd.) was sprayed (film thickness 30 µm after dried) using the same device. After that, the test piece was dried at 60° C. for 60 min, thereby forming a multi-layer coating film.

<Evaluation Conditions>

The test piece on which the multi-layer coating film was thus formed according to the coating conditions (I) was immersed in a resistance water bath of 40° C. for 240 hours. After collecting the test piece from the bath, outer appearance thereof was evaluated within one hour, failing test pieces with outer appearance problems such as swelling or blistering as (abnormal).

(12) Initial Adhesiveness

<Coating Condition (II)>

A test piece of 150 mm in length, 70 mm in width, and 2.5 mm in thickness was cut out from the multilayer plate thus obtained. On a surface of the test piece, a primer (Kansai Paint Co., Ltd., CLEAR WHITE (NE) was sprayed (film thickness 12 µm after dried) by using a reciprocator (Carlisle Fluid Technologies Ransburg Japan KK, RIH1200H035), and dried at 60° C. for 3 min. After that, an aqueous baseYcoat (Kansai Paint Co., Ltd. 202 Sun Metallic) was sprayed thereon (film thickness 20 µm after dried) using the same device and dried at 60° C. for 3 min. On top of that, clear paint (comprising HS clear base main agent made by Kansai Paint Co., Ltd., and HS clear G curing agent made by Kansai Paint Co., Ltd., and thinner 30 made by Kansai Paint Co., Ltd.) was sprayed (film thickness 30 µm after dried) using the same device. After that, the test piece was dried at 60° C. for 60 min, thereby forming a multi-layer coating film.

<Evaluation Conditions>

The coating film of the test piece on which the multi-layer coating film was formed according to the coating conditions (II) was notched with a razor blade in a chess pattern in which 100 of 2-mm cells were arranged (10 cells×10 cells) and a cellophane tape (registered trademark) (NICHIBAN Co., Ltd.) of 24 mm in width was adhered thereon with pressure applied by a finger, and peeled off therefrom by pulling an edge of the cellophane tape abruptly. The evaluation was made based on the number of the cells left thereon as residual ratio (%).

Example 1

(Preparation of Layer A)

Here, 75 wt % of The propylene homopolymer (A1-1), 10 wt % of the resin component (A2-1) with a polar group in its molecular chain, and 15 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-1). The resin composition (a-1) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-1) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-1) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 2

(Preparation of Layer A)

Here, 65 wt % of the propylene homopolymer (A1-1), 20 wt % of the resin component (A2-1) with a polar group in its molecular chain, and 15 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-2). The resin composition (a-2) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-2) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-2) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 3

(Preparation of Layer A)

Here, 55 wt % of the propylene homopolymer (A1-1), 30 wt % of the resin component (A2-1) with a polar group in its molecular chain, and 15 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-3). The resin composition (a-3) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-3) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-3) compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 4

(Preparation of Layer A)

Here, 50 wt % of the propylene homopolymer (A1-1), 35 wt % of the resin component (A2-1) with a polar group in its molecular chain, and 15 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-4). The resin composition (a-4) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-4) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-4) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 5

(Preparation of Layer A)

Here, 45 wt % of The propylene homopolymer (A1-1), 40 wt % of the resin component (A2-1) with a polar group in its molecular chain, and 15 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-5). The resin composition (a-5) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-5) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-5) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 6

(Preparation of Layer A)

Here, 35 wt % of the propylene homopolymer (A1-1), 50 wt % of the resin component (A2-1) with a polar group in its molecular chain, and 15 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-6). The resin composition (a-6) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-6) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-6) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 7

(Preparation of Layer A)

Here, 60 wt % of The propylene homopolymer (A1-1), 35 wt % of the resin component (A2-1) with a polar group in its molecular chain, and 10 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-7). The resin composition (a-7) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-7) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-7) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 8

(Preparation of Layer A)

Here, 35 wt % of the propylene homopolymer (A1-1), 35 wt % of the resin component (A2-1) with a polar group in its molecular chain, and 30 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-8). The resin composition (a-8) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-8) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-8) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 9

(Preparation of Layer A)

Here, 50 wt % of the propylene homopolymer (A1-1), 35 wt % of the resin component (A2-4) with a polar group in its molecular chain, and 30 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-9). The resin composition (a-9) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-9) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-9) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 10

(Preparation of Layer A)

Here, 50 wt % of the propylene homopolymer (A1-1), 35 wt % of the resin component (A2-1) with a polar group in its molecular chain, and 30 wt % of the thermoplastic elastomer component (A3-3) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-10). The resin composition (a-10) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-10) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-10) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 11

(Preparation of Layer A)

Here, 50 wt % of the propylene homopolymer (A1-1), 35 wt % of the resin component (A2-1) with a polar group in its molecular chain, and 15 wt % of the thermoplastic elastomer component (A3-4) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-11). The resin composition (a-11) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-11) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-11) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Example 12

(Preparation of Layer A)

Here, 50 wt % of the propylene homopolymer (A1-1), 35 wt % of the resin component (A2-1) with a polar group in its molecular chain, and 15 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-4). The resin composition (a-4) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.200 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 4.6 mm in thickness. Kinds of components and contents thereof in the layer B are shown on Table 1.

(Preparation of Multilayer Article for Compression Molding)

A multilayer article (d-12) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-12) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Comparative Example 1

(Preparation of Layer A)

Here, 85 wt % of the propylene homopolymer (A1-1), and 15 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-12). The resin composition (a-12) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-13) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-13) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Comparative Example 2

(Preparation of Layer A)

Here, 50 wt % of the propylene homopolymer (A1-1), 35 wt % of the resin component (A2-2) with a polar group in its molecular chain, and 30 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-13). The resin composition (a-13) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-14) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-14) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Comparative Example 3

(Preparation of Layer A)

Here, 50 wt % of the propylene homopolymer (A1-1), 35 wt % of the resin component (A2-3) with a polar group in its molecular chain, and 15 wt % of the thermoplastic elastomer component (A3-1) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-14). The resin composition (a-14) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-15) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-15) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Comparative Example 4

(Preparation of Layer A)

Here, 50 wt % of the propylene homopolymer (A1-1), 35 wt % of the resin component (A2-1) with a polar group in its molecular chain, and 15 wt % of the thermoplastic elastomer component (A3-2) without a polar group in its molecular chain were mixed together, and melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-15). The resin composition (a-15) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-16) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-16) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

Comparative Example 5

(Preparation of Layer A)

Here, 100 wt % of the propylene homopolymer (A1-1) were melted, mixed, and kneaded by using a 40-mm single-screw extruder VS40-28 (TANABE PLASTICS MACHINERY Co., Ltd.) with a cylinder setting temperature of 220° C. and a screw rotating speed of 70 rpm, thereby preparing a resin composition (a-16). The resin composition (a-16) thus obtained was compression-molded by using a compression-molding device (P-37, Shinto Metal Industries, Ltd.) with a temperature of 230° C., pressing pressure of 10 MPa, and 10-min duration, thereby obtaining a layer A of 15 cm in width, 15 cm in length, and 0.336 mm in thickness. Kinds of components and contents thereof in the layer A are shown on Table 1.

(Preparation of Layer B)

Here, 70 wt % of the propylene homopolymer (B1-1) and 30 wt % of talc (B2-1) were mixed, and melted, mixed, and kneaded by using a 15-mm twin-screw extruder KZW15-45MG (TECHNOVEL) with a cylinder setting temperature of 220° C., a screw rotating speed of 5100 rpm, and an extrusion amount: about 4 kg/hour, thereby obtaining a resin composition (c-1). The resin composition (c-1) thus obtained was compression-molded by using a compression-molding device (P-37, Shinto Metal Industries, Ltd.) with a temperature of 230° C., pressing pressure of 10 MPa, and 10-min duration, thereby obtaining a layer B of 15 cm in width, 15 cm in length, and 7.73 mm in thickness. Kinds of components and contents thereof in the layer B are shown on Table 1.

(Preparation of Multilayer Article for Compression Molding)

A multilayer article (d-17) for compression molding was prepared by adhering a single sheet of the layer A on an upper surface of the layer B and adhering a single sheet of the layer A on a lower surface of the layer B. A ratio of the total thickness of the layers A and a ratio of the thickness of the layer B in the multilayer article for compression molding are shown on Table 1.

(Preparation of Multilayer Plate)

The multilayer article (d-17) for compression molding was introduced into a hot press molding device with a press plate set to 160° C., and pressed up to 100 t, and kept at the pressure for 5 min, and cooled to 80° C. under the pressure maintained until then and released, thereby obtaining a multilayer plate of 2.5 mm in thickness. Properties of the multilayer plate thus prepared are shown on Table 2.

TABLE 2

|  | Compression rate (%) | Waterproof adhesiveness | Initial adhesiveness (%) |
|---|---|---|---|
| Example 1 | 29.7 | Normal | 42 |
| Example 2 | 29.7 | Normal | 64 |
| Example 3 | 29.7 | Normal | 100 |
| Example 4 | 29.7 | Normal | 100 |
| Example 5 | 29.7 | Normal | 86 |
| Example 6 | 29.7 | Normal | 72 |
| Example 7 | 29.7 | Normal | 45 |
| Example 8 | 29.7 | Normal | 34 |
| Example 9 | 29.7 | Normal | 56 |
| Example 10 | 29.7 | Normal | 70 |
| Example 11 | 29.7 | Normal | 100 |
| Example 12 | 50.0 | Normal | 100 |
| Comparative Example 1 | 29.7 | Abnormal | 5 |
| Comparative Example 2 | 29.7 | Abnormal | 100 |

TABLE 1

|  |  | Components |  |  |  |  |  |  | Ratio of thickness of layer (%) |
|---|---|---|---|---|---|---|---|---|---|
|  | Layer | Kind | wt % | Kind | wt % | Kind | wt % | Kind | wt % |  |
| Example 1 | A | A1-1 | 75 | A2-1 | 10 | A3-1 | 15 | — | — | 8 |
| (d-1) | B | B1-1 | 70 | — | — | — | — | B2-1 | 30 | 92 |
| Example 2 | A | A1-1 | 65 | A2-1 | 20 | A3-1 | 15 | — | — | 8 |
| (d-2) | B | B1-1 | 70 | — | — | — | — | B2-1 | 30 | 92 |
| Example 3 | A | A1-1 | 55 | A2-1 | 30 | A3-1 | 15 | — | — | 8 |
| (d-3) | B | B1-1 | 70 | — | — | — | — | B2-1 | 30 | 92 |
| Example 4 | A | A1-1 | 50 | A2-1 | 35 | A3-1 | 15 | — | — | 8 |
| (d-4) | B | B1-1 | 70 | — | — | — | — | B2-1 | 30 | 92 |
| Example 5 | A | A1-1 | 45 | A2-1 | 40 | A3-1 | 15 | — | — | 8 |
| (d-5) | B | B1-1 | 70 | — | — | — | — | B2-1 | 30 | 92 |
| Example 6 | A | A1-1 | 35 | A2-1 | 50 | A3-1 | 15 | — | — | 8 |
| (d-7) | B | B1-1 | 70 | — | — | — | — | B2-1 | 30 | 92 |
| Example 7 | A | A1-1 | 60 | A2-1 | 35 | A3-1 | 10 | — | — | 8 |
| (d-7) | B | B1-1 | 70 | — | — | — | — | B2-1 | 30 | 92 |
| Example 8 | A | A1-1 | 35 | A2-1 | 35 | A3-1 | 30 | — | — | 8 |
| (d-8) | B | B1-1 | 70 | — | — | — | — | B2-1 | 30 | 92 |
| Example 9 | A | A1-1 | 50 | A2-4 | 35 | A3-1 | 15 | — | — | 8 |
| (d-9) | B | B1-1 | 70 | — | — | — | — | B2-1 | 30 | 92 |
| Example 10 | A | A1-1 | 50 | A2-1 | 35 | A3-3 | 15 | — | — | 8 |
| (d-10) | B | B1-1 | 70 | — | — | — | — | B2-1 | 30 | 92 |
| Example 11 | A | A1-1 | 50 | A2-1 | 35 | A3-4 | 15 | — | — | 8 |
| (d-11) | B | B1-1 | 70 | — | — | — | — | B2-1 | 30 | 92 |
| Example 12 | A | A1-1 | 50 | A2-1 | 35 | A3-1 | 15 | — | — | 8 |
| (d-12) | B | B1-1 | 70 | — | — | — | — | B2-1 | 30 | 92 |
| Comparative Example 1 | A | A1-1 | 85 | — | — | A3-1 | 15 | — | — | 8 |
| (d-13) | B | B1-1 | 70 | — | — | — | — | B2-1 | 30 | 92 |
| Comparative Example 2 | A | A1-1 | 50 | A2-2 | 35 | A3-1 | 15 | — | — | 8 |
| (d-14) | B | B1-1 | 70 | — | — | — | — | B2-1 | 30 | 92 |
| Comparative Example 3 | A | A1-1 | 50 | A2-3 | 35 | A3-1 | 15 | — | — | 8 |
| (d-15) | B | B1-1 | 70 | — | — | — | — | B2-1 | 30 | 92 |
| Comparative Example 4 | A | A1-1 | 50 | A2-1 | 35 | A3-2 | 15 | — | — | 8 |
| (d-16) | B | B1-1 | 70 | — | — | — | — | B2-1 | 30 | 92 |
| Comparative Example 5 | A | A1-1 | 100 | — | — | — | — | — | — | 8 |
| (d-17) | B | B1-1 | 70 | — | — | — | — | B2-1 | 30 | 92 |

TABLE 2-continued

| | Compression rate (%) | Waterproof adhesiveness | Initial adhesiveness (%) |
|---|---|---|---|
| Comparative Example 3 | 29.7 | Normal | 5 |
| Comparative Example 4 | 29.7 | Abnormal | 0 |
| Comparative Example 5 | 29.7 | Abnormal | 0 |

From Table 2, it can be understood that the multilayer plates according to the Examples are excellent in the waterproof adhesiveness and the initial adhesiveness, that is, in the coating properties. That is, it was confirmed that the multilayer article for compression molding according to the present embodiment can express excellent coating properties after compression molding. Moreover, from this, it can be understood that the compression molded article according to the present embodiment is excellent in the coating properties and that the method for producing the compression molded article according to the present embodiment can produce a compression molded article excellent in the coating properties.

DESCRIPTION OF REFERENCE SIGNS 10a, 10b Layer A
20 Layer B
100 multilayer article for compression molding
200 Compression molded article

The invention claimed is:

1. A multilayer article for compression molding, comprising a first layer A, a layer B, and a second layer A, in this order,
wherein a total thickness of the first layer A and the second layer A is 8% to 10% and a total thickness of the layer B is 90% to 92% where a sum of the total thickness of the first layer A and the second layer A and the total thickness of the layer B is 100%,
wherein the first layer A and the second layer A contain a propylene homopolymer component (A1), a resin component (A2) having polar group(s) in its molecular chain, and a thermoplastic elastomer component (A3) having no polar group(s) in its molecular chain, in such a way that content of the propylene homopolymer component (A1) is 35 wt % or more but 75 wt % or less, content of the resin component (A2) is 10 wt % or more but 50 wt % or less, and content of the thermoplastic elastomer component (A3) is 10 wt % or more but 30 wt % or less,
where a sum of the contents of the propylene homopolymer component (A1), the resin component (A2), and the thermoplastic elastomer component (A3) is 100 wt %,
wherein the propylene homopolymer component (A1) has a melt mass flow rate measured at 230° C. under a load of 2.16 kgf of 0.5 g/10 min;
wherein the resin component (A2) having polar group(s) in its molecular chain has a melt mass flow rate measured at 190° C. under a load of 2.16 kgf of 0.25 g/10 min or more and 0.41 g/10 min or less, and is a copolymer consisting of a structural unit derived from the compound with the polar group in an amount of 5 wt % or more and 17 wt % or less, and a structural unit derived from ethylene in an amount of 83 wt % or more and 95 wt % or less, and is at least one resin selected from the group consisting of an ethylene-methyl methacrylate copolymer and an ethylene-vinyl acetate copolymer;
wherein the thermoplastic elastomer component (A3) having no polar group(s) in its molecular chain is an olefin-based elastomer copolymer comprising a structural unit derived from ethylene and a structural unit derived from propylene or 1-butene and having a melt mass flow rate measured at 190° C. under a load of 2.16 kgf of 0.5 g/10 min or more and 0.6 g/10 min or less, and
wherein the layer B contains a propylene homopolymer component (B1) and an inorganic filler (B2), wherein a content of the propylene homopolymer component (B1) is 70 wt % and a content of the inorganic filler (B2) is 30 wt %,
where a sum of the contents of the propylene polymer component (B1) and the inorganic filler (B2) is 100 wt %;
wherein the propylene homopolymer component (B1) has a melt mass flow rate measured at 230° C. under a load of 2.16 kgf of 0.5 g/10 min;
wherein the inorganic filler (B2) is talc and satisfies requirement (1-a), requirement (1-b) and requirement (1-c),
requirement (1-a): a median diameter D50(L) measured by a laser diffraction method according to JIS R1629 is 10 μm or more and 25 μm or less,
(1-b): a median diameter D50(S) measured by centrifugal sedimentation method according to JIS R1619 is 2 μm or more and 8 μm or less, and
(1-c): an aspect ratio constant calculated by equation (1) is 2 or more and 15 or less;

Aspect ratio constant=$\{D50(L)-D50(S)\}/D50(S)$     (1).

2. The multilayer article for compression molding according to claim 1, wherein the thermoplastic elastomer component (A3) having no polar group(s) in its molecular chain is an elastomer comprising a structural unit derived from 1-butene and a structural unit derived from ethylene.

3. The multilayer article for compression molding according to claim 1, wherein the thermoplastic elastomer component (A3) having no polar group(s) in its molecular chain is an elastomer comprising a structural unit derived from propylene and a structural unit derived from ethylene.

* * * * *